United States Patent
Washington

[19]

[11] Patent Number: 5,984,393
[45] Date of Patent: Nov. 16, 1999

[54] SHOVEL WITH PIVOTING HEAD

[76] Inventor: Rodney H. Washington, 227 Troon Ct., Limerick, Pa. 19468

[21] Appl. No.: 09/106,326

[22] Filed: Jun. 29, 1998

[51] Int. Cl.⁶ .................. A01B 1/22; B25G 3/12
[52] U.S. Cl. ................ 294/53.5; 294/54.5; 294/57
[58] Field of Search ............... 294/49, 53.5, 54.5, 294/55, 57–59, 8; 16/110 R, 111 R, 114 R, 116 R; 37/189, 242, 265, 285

[56] References Cited

U.S. PATENT DOCUMENTS

| | | | |
|---|---|---|---|
| 357,408 | 2/1887 | Pittenger | 294/53.5 |
| 813,963 | 2/1906 | Luney | 294/54.5 |
| 1,176,531 | 3/1916 | Fite et al. | 294/53.5 |
| 1,869,299 | 7/1932 | Bracht | 294/8 |
| 2,085,382 | 6/1937 | Nebor | 294/54.5 |
| 2,221,219 | 11/1940 | Nelson | 294/9 |
| 2,621,957 | 12/1952 | Hartrampf | 294/8 |
| 2,720,043 | 10/1955 | Chamberlin | 294/54.5 X |
| 2,967,363 | 1/1961 | Meier | 294/53.5 X |
| 3,751,094 | 8/1973 | Bohler | 294/58 |
| 4,538,847 | 9/1985 | Lapshansky | 294/51 |
| 5,440,828 | 8/1995 | Simpson | 37/285 |

FOREIGN PATENT DOCUMENTS

| | | | |
|---|---|---|---|
| 14920 | 2/1905 | Norway | 294/57 |

*Primary Examiner*—Johnny D. Cherry
*Attorney, Agent, or Firm*—LaMorte & Associates

[57] ABSTRACT

A shovel assembly having a shovel head and a handle shaft. The handle shaft has a first end and a second end, wherein the first end of the handle shaft propagates along a longitudinal axis. A pivot joint is interposed between the shovel head and the handle shaft. The pivot joint selectively enables the shovel head to rotate about the longitudinal axis. The pivot joint is configurable into three distinct conditions. In a first condition, the pivot joint rigidly couples the shovel head to the handle shaft. In a second condition, the pivot joint enables the shovel head to rotate around the longitudinal axis of the handle shaft in a first direction. Lastly, in a third condition, the pivot joint enables the shovel head to rotate around the longitudinal axis of the handel shaft in a second direction. A manual control is provided on the shovel for selectively configuring the pivot joint between the first condition, the second condition and the third condition.

14 Claims, 5 Drawing Sheets

5,984,393

SHOVEL WITH PIVOTING HEAD

BACKGROUND OF THE INVENTION

1. Field of the Invention

The present invention relates to shovels and the structure of shovel heads. More specifically, the present invention relates to shovels where the heads of the shovels can be selectively moved relative the handle of the shovel.

2. Description of the Prior Art

Shovels come in many different shapes and styles. However, most every shovel has both a head and handle shaft that extends from the head. The shape of the shovel head and the handle shaft varies widely depending upon the intended use of the shovel. For example, snow shovels typically have large heads and short handles, which is ideal for shoveling snow. Digging shovels typically have spade shaped heads and long handles which is ideal for digging earth from the ground.

Regardless of the shape of the shovel, the manual act of shoveling remains basically the same. The head of the shovel is plunged into a material to be moved, such as snow, dirt, gravel, etc. An amount of material is then lifted up on the head of the shovel by manipulating the handle shaft. The person then turns and moves the head of the shovel to a discharging point wherein the shovel head is tilted and the material unloaded. The manual act of shoveling uses many different muscle groups in the arms, shoulders, backs and legs. The act of turning the shovel to the discharging point and twisting the shovel to unload the shovel head is particularly stressful to the back and arms of the person shoveling. As a result, people commonly strain muscles in their backs and arms when they do shovel.

Shovels typically have a straight handle shaft that is rigidly affixed to the head of the shovel. However, in the prior art, shovels have been developed where the head of the shovel can be selectively moved in relation to the position of the handle. Such prior art shovels are exemplified by U.S. Pat. No. 813,983 to Luney, entitled Snow Shovel; U.S. Pat. No. 2,221,219 to Nelson, entitled Adjustable Shovel; and U.S. Pat. No. 5,440,828 to Simpson, entitled Manual Snow Removal Tool. The primary use of such shovels is to angle the head of the shovel so that the shovel pushes material off to one side when the shovel is advanced along the ground like a plow. Although such prior art shovels have angled heads, the manual act of shovelling remains the same. Consequently, such prior art shovels do not alleviate the stresses to the muscles of the arms and back that are caused during the act of shoveling.

Although most shovels have straight handle shafts, some prior art shovels have contoured shafts that are configured to be more ergonomically efficient. By improving the ergonomics of the shovel handle shaft, the stresses experienced by the muscles in the arms and legs are decreased. Such prior art ergonomic shovel handle shafts are exemplified by U.S. Pat. No. 3,751,094 to Bohler, entitled Slidably Adjustable Auxiliary Lift Handle.

Although prior art shovels have been designed with shafts that better help a person grasp and manipulate the shovel, the prior art still has not addressed the problem of alleviating muscle stress caused by a persons' body twisting when shoveling. A need therefore exists in the art for a shovel that reduces the amount of twisting required in the act of shoveling, thereby reducing the number of injuries caused by twisting when shoveling. This need is met by the present invention as described and claimed below.

SUMMARY OF THE INVENTION

The present invention is a shovel assembly. The shovel assembly has a shovel head and a handle shaft. The handle shaft has a first end and a second end, wherein the first end of the handle shaft propagates along a longitudinal axis. A pivot joint is interposed between the shovel head and the first end of the handle shaft. The pivot joint selectively enables the shovel head to rotate about the longitudinal axis of the shaft's first end. The pivot joint is configurable into three distinct conditions. In a first condition, the pivot joint rigidly couples the shovel head to the handle shaft. In a second condition, the pivot joint enables the shovel head to rotate around the longitudinal axis of the handle shaft in a first direction. Lastly, in a third condition, the pivot joint enables the shovel head to rotate around the longitudinal axis of the handel shaft in a second direction.

A manual control is provided on the shovel for selectively configuring the pivot joint between the first condition, the second condition and the third condition.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention shovel device can be configured to be any type of shovel, such as a digging spade, a trenching shovel, a coal shovel, and the like, the present invention shovel device is particularly well adapted for use in a snow shovel configuration. As a result, the present invention shovel device will be described in a snow shovel configuration in order to set forth the best mode contemplated for the device.

Figure 1:
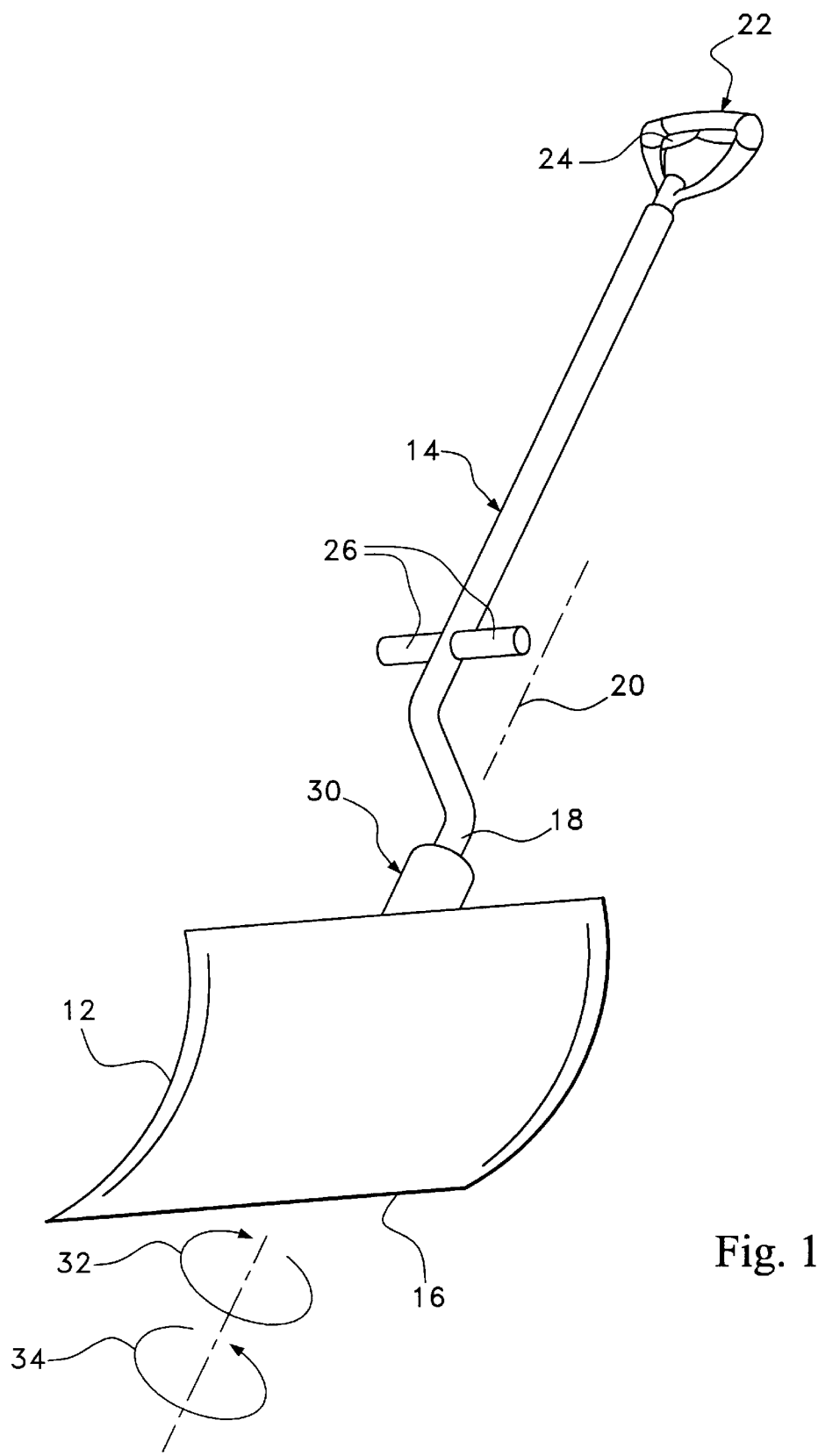
FIG. 1 is a perspective view of an exemplary embodiment of a shovel in accordance with the present invention.

Referring to FIG. 1, an exemplary embodiment of a shovel device 10 is shown in accordance with the present invention. As is typical, the shovel device 10 has a head 12 and a handle shaft 14. The head 12 of the shovel 10 in the shown exemplary embodiment is enlarged having a generally flat forward edge 16. Such a shovel head design is typical of many types of prior art snow shovels.

The handle shaft 14 of the shovel device 10 extends from the rearward side of the shovel head 12. The handle shaft 14 can be straight or any other known configuration. However, in the shown embodiment, the handle shaft 14 contains an S-bend near the shovel head 12 that positions the shovel head 12 at a level below where the handle shaft 14 is grasped. The first end 18 of handle shaft 14 engages the shovel head 12. The first end 18 of the handle shaft 14 propagates along a longitudinal axis 20.

The second end of the handle shaft 12 terminates with a handle assembly 22. The handle assembly 22 contains the control lever 24 that will later be explained. A pair of optional side handles 26 extend horizontally from opposite sides of the handle shaft 14 at a point between the first end 18 and the second end of the handle shaft 14. The side handles 26 are rigidly connected to the handle shaft 14 of the shovel and provide a surface which is readily gripped.

The head 12 of the shovel 10 is attached to the handle shaft 14 via a pivot joint 30. As will later be explained, the pivot joint 30 can be configured into at least three different conditions. In a first condition, the pivot joint 30 firmly interconnects the shovel head 12 to the handle shaft 14. In such a configuration, the shovel head 12 cannot be moved independently of the handle shaft 14 and the shovel 10 operates in the same manner as does as a prior art shovel.

In a second configuration, the shovel head 12 is capable of rotating clockwise about the longitudinal axis of the first end 18 of the handle shaft 14, as is indicated by arrow 32. When in this second configuration, the front edge 16 of the shovel head is capable of tilting from the horizontal orientation shown into a vertical configuration. The movement of the shovel head is about its own midpoint and is independent of the handle shaft 14.

In a third configuration, the shovel head 12 is capable of rotating counter clockwise about the longitudinal axis 20, as is indicated by arrow 34. When in this third configuration, the front edge 16 of the shovel head 12 is capable of tilting from the horizontal orientation shown into a vertical configuration. Again, the movement of the shovel head 12 is independent of the handle shaft 14.

Figure 2:
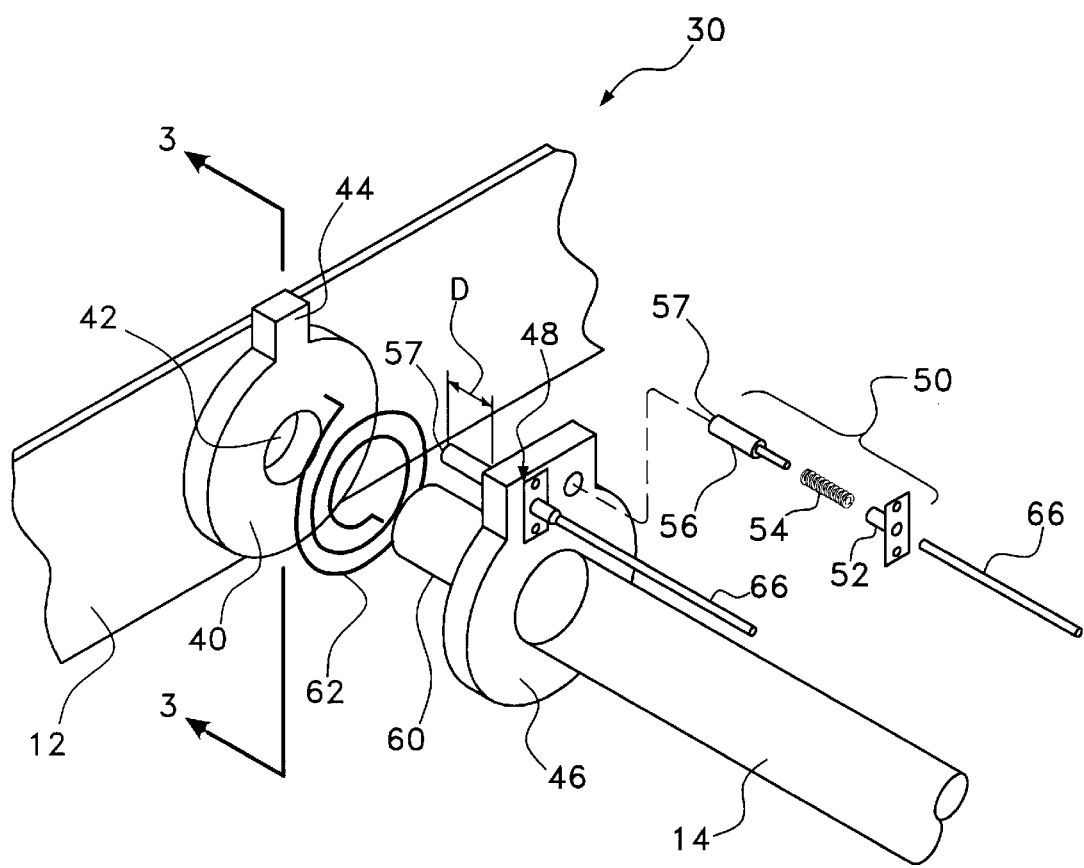
FIG. 2 is an exploded, fragmented view of an exemplary embodiment of a pivot joint contained within the present invention shovel.

Referring to FIG. 2 an exemplary embodiment of the pivot joint 30 is illustrated. In the shown embodiment, it can be seen that a flange 40 is affixed to the rear of the shovel head 12. The flange 40 defines an aperture 42 that is centered in the middle of the rear of the shovel head 12. A locking tab 44 radially extends from the flange 40. In the shown embodiment, the locking tab 44 extends vertically upwardly. However, the locking tab 44 can be set into any other directional orientation, if desired.

The shaft 14 of the shovel also terminates with a flange 46. The shaft flange 46 supports two spring loaded pin assemblies 48, 50. Each spring loaded pin assembly 48, 50 contains a tubular housing 52, a spring 54 and a pin element 56. The pin element 56 extends through the tubular housing 52. The first end 57 of each pin element 56 extends a predetermined distance D beyond the tubular housing 52. The first end 57 of each pin element 56 is biased into this position by the spring elements 54. If a force is applied to the second end of one of the pin elements 56, that is in excess of the bias of the spring element 54, the first end 57 of that pin element 56 can be retracted into the tubular housing 52. The result would be that the predetermined distance D would decrease. Many different types of spring loaded pin assemblies are used in the prior art. Many such prior art spring loaded pins can be adapted for use in the present invention.

A pivot pin 60 extends from the shaft flange 46. The pivot pin 60 aligns with and enters the aperture 42 on the shovel head flange 40. Accordingly, the shovel head flange 40 is capable of rotating about the pivot pin 60. A torsion spring 62 is disposed around the pivot pin 60. The torsion spring 62 is attached to both the shovel head flange 40 and the shovel shaft flange 46. The torsion spring 62 provides a bias to the shovel head flange 40 that retains the shovel head flange 40 in a set position relative the shovel shaft flange 46. When the shovel head flange 40 is in the set position, the head 12 of the shovel is as it appears in FIG. 1, wherein the front edge 16 (FIG. 1) of the shovel head 12 is held in the horizontal. The bias of the torsion spring 62 is calibrated to maintain the head 12 of the shovel in the set position when no other material is on the shovel head 12. However, when snow or other material is positioned on the shovel head 12, the bias of the torsion spring 62 is overcome by the weight of the material on the shovel head 12 and the shovel head 12 can pivot around the pivot pin 60.

Figure 3:
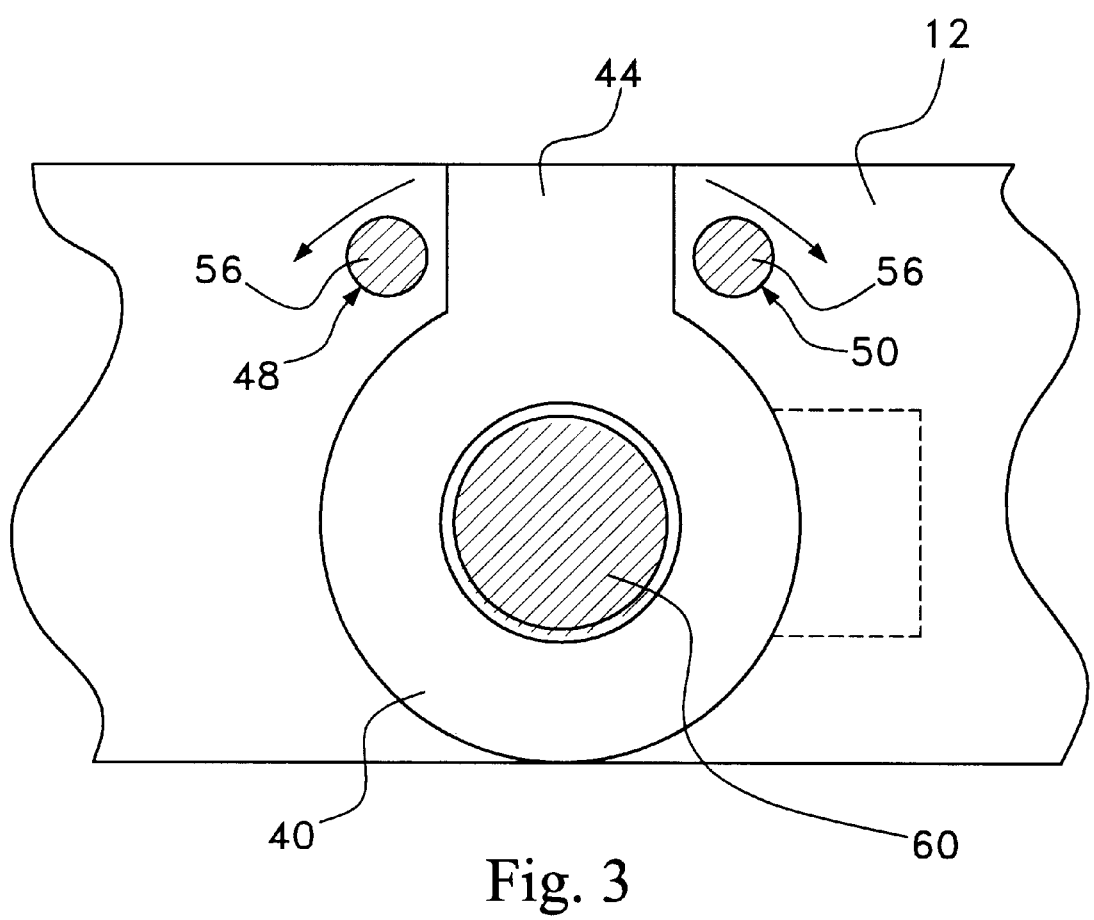
FIG. 3 is a cross-sectional view of the exemplary embodiment of the pivot joint set forth in FIG. 2, viewed along sectional line 3—3 while configured in a first condition.

When the shovel head flange 40 and the handle shaft flange 46 face each other, the spring biased pin assemblies 48, 50, that extend from the shaft flange 46, protrude on either side of the shovel head flange's locking tab 44. Referring to FIG. 3, it can be seen that when the pin elements 56 of both of the spring loaded pin assemblies 48, 50 are positioned on either side of the locking flange 44, the shovel head flange 40 is incapable of rotating around the pivot pin 60 in either the clockwise direction or the counter clockwise direction. The shovel head flange 40 is therefore locked into one set position. Since the shovel head flange 40 is affixed to the shovel head 12, the shovel head 12 is therefore also locked into a set position and the shovel can be used in the same manner as a prior art shovel.

Returning to FIG. 2, it can be seen that the second end of the pin element 56 in each of the spring loaded pin assemblies 48, 50 is attached to a control cable 66. When a tensile force is applied to the control cable 66 that is capable of overcoming the bias of the spring element 54, the pin element 57 retracts. Consequently, the predetermined distance D that the pin elements 56 extend can be reduced until the pin elements 56 clear the locking tab 44 on the shovel head flange 40.

The shown embodiment has two spring loaded pin assemblies 48, 50, wherein each of the spring loaded pin assemblies 48, 50 is controlled by a cable 66. By applying a tensile force to either cable 66, each of the spring loaded pin assemblies 48, 50 can be caused to selectively disengage the shovel head flange 40. The cables 66 extend from the spring loaded pin assemblies 48, 50 to the handle assembly 22 (FIG. 1) of the shovel assembly through the center of the handle shaft 14.

Figure 4:
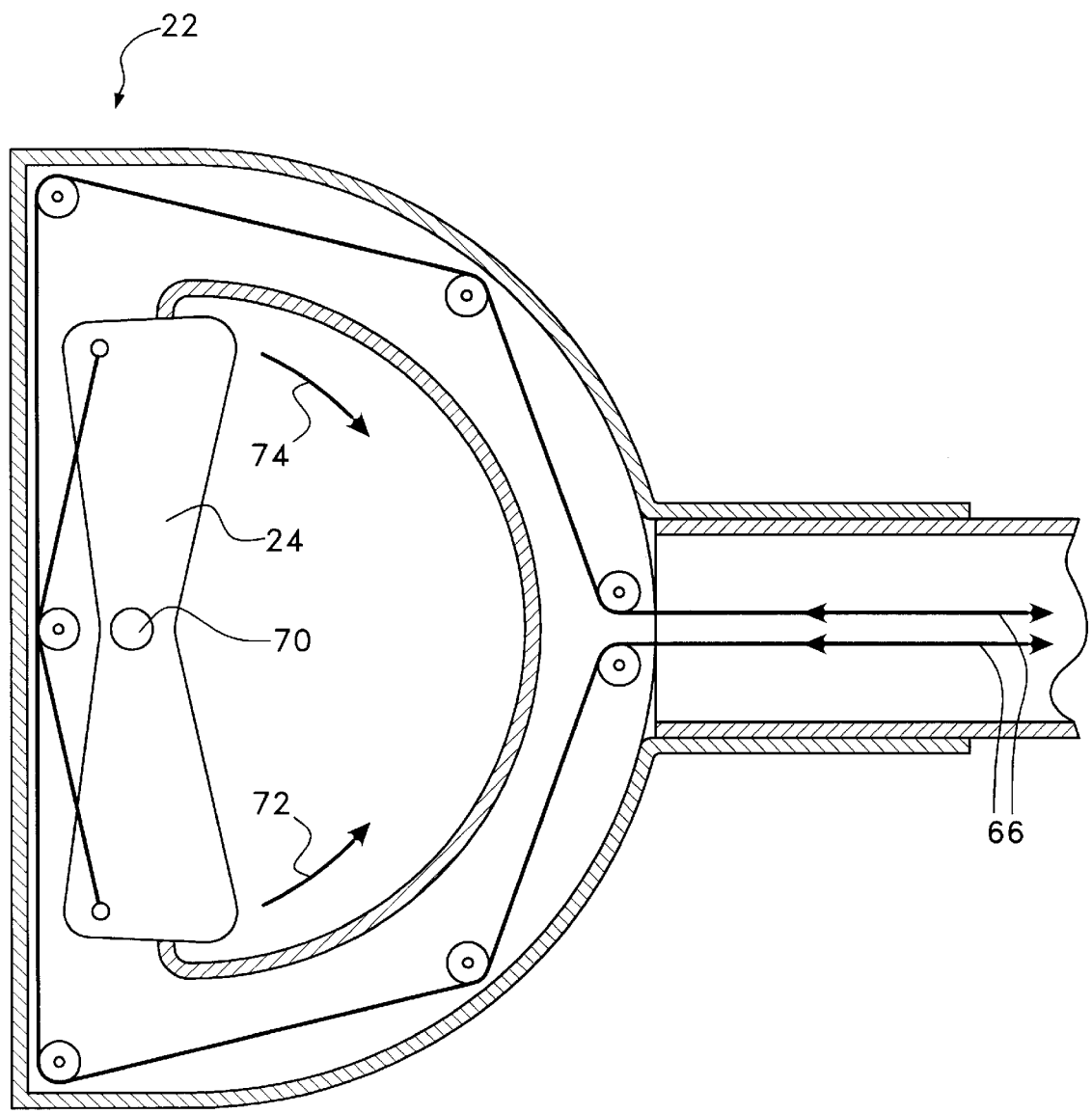
FIG. 4 is a cross-sectional view of an embodiment of the handle assembly portion of the present invention shovel.

Referring to FIG. 4, it can be seen that the handle assembly 22 of the shovel contains a control lever 24. The control lever 24 is mounted within the handle assembly 22 by a central pivot 70. The cables 66 are connected to different sides of the control lever 24. If the control lever 24 is pivoted around the pivot 70 in the direction of arrow 72, then a tensile force is applied to the right cable. Similarly, if the control lever 24 is pivoted around the pivot 70 in the direction of arrow 74, then a tensile force is applied to the left cable.

Figure 5:
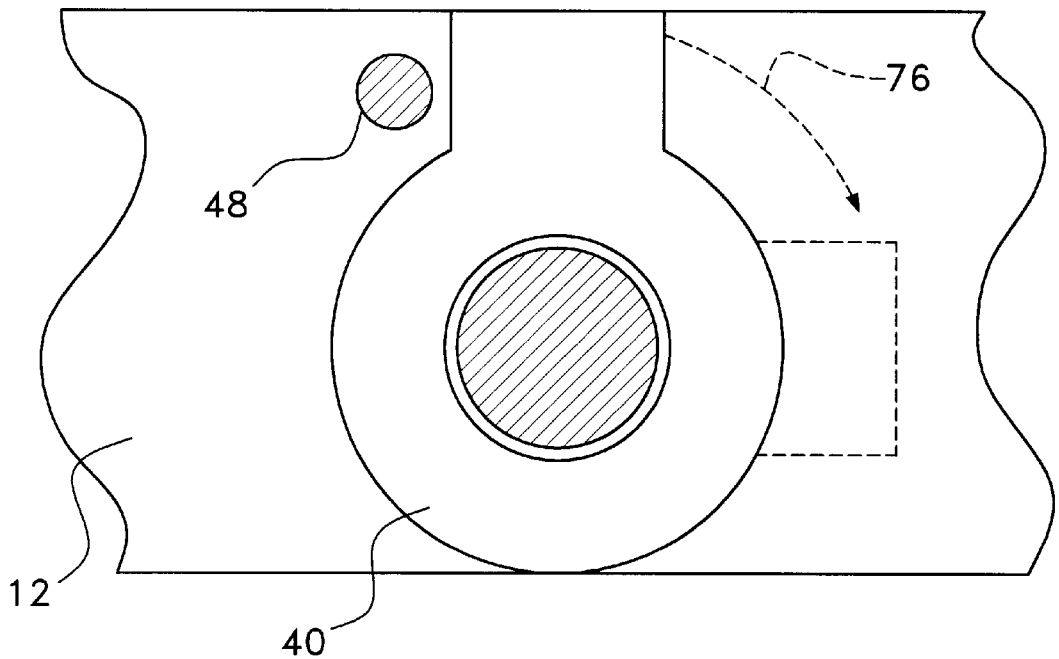
FIG. 5 is a cross-sectional view of the exemplary embodiment of the pivot joint set forth in FIG. 2, viewed along sectional line 3—3 while configured in a second condition.

When the tensile force is applied to the right cable, the right spring loaded pin assembly 50 (FIG. 2) is effected, wherein the right spring loaded pin assembly is caused to disengage the shovel head flange. Referring to FIG. 5, it can be seen that when the right spring loaded pin assembly (not shown) is removed, only the left spring loaded pin assembly remains in place. The shovel head flange 40 and the shovel head are therefore free to rotate to the right in the direction of arrow 76.

Figure 6:
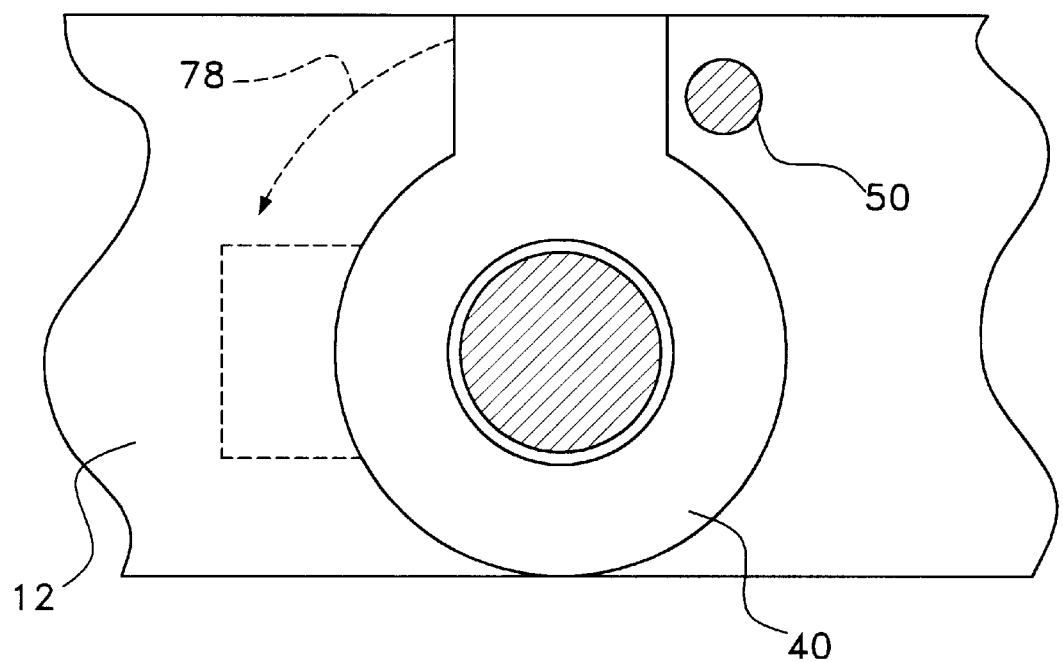
FIG. 6 is a cross-sectional view of the exemplary embodiment of the pivot joint set forth in FIG. 2, viewed along sectional line 3—3 while configured in a third condition.

When a tensile force is applied to the left cable, the left spring loaded pin assembly is effected, wherein the left spring laded pin assembly is caused to disengage the shovel head flange. Referring to FIG. 6, it can be seen that when the left spring loaded pin assembly (not shown) is removed, only the right spring loaded pin assembly 50 remains in place. The shovel head flange 40 and the shovel head 12 are therefore free to rotate to the left in the direction of arrow 78.

Returning to FIG. 1, it will be understood that to utilize the shovel device 10, a person lifts up material with the shovel head 12 in a traditional manner. To unload the shovel head 12, a person then engages the control lever 24 in the handle assembly 22. If the control lever 24 is moved to the left, the shovel head will rotate to the left until the load carried by the shovel head 12 falls off of the shovel head. Once the load is removed, the shovel head 12 will automatically return to its original position under influence of the torsion spring 62 (FIG. 2). Similarly, if a person wants to unload the shovel head 12 from its right side, a person then engages the right side of the control lever 24 in the handle assembly 22. Once the control lever 24 is moved to the right, the shovel head 12 rotates to the right until the load carried by the shovel head 12 falls off of the right side of the shovel head 12. Once the load is removed, the shovel head 12 will automatically return to its original position.

It will be understood that a person skilled in the art could make alternate embodiments of the present invention using functionally equivalent components that have not been specifically described. For example, many different types of control mechanisms can be used to selectively supply a tensile force to cables within the shovel assembly. All such modifications are intended to be included in the scope of this disclosure as defined by the appended claims.

What is claimed is:

1. A shovel device, comprising:

a shovel head having a forward edge; a a shaft having a first end and a second end, wherein said first end of said shaft propagates along a longitudinal axis;

a pivot joint interposed between said shovel head and said shaft, said pivot joint being selectively configurable between a first condition, a second condition and a third condition, wherein in said first condition said shovel head is rigidly coupled to said shaft, in said second condition said shovel head is capable of rotating about said longitudinal axis in a first direction, and in said third condition said shovel head is capable of rotating about said longitudinal axis in a second direction that is opposite of said first direction.

2. The device according to claim 1, further including a manual control for selectively configuring said pivot joint between said first condition, said second condition and said third condition.

3. The device according to claim 2, further including a handle at said second end of said shaft, wherein said manual control is contained within said handle.

4. The device according to claim 1, wherein said shovel head is in a predetermined orientation with respect to said shaft when said pivot joint is configured in said first condition.

5. The device according to claim 4, wherein said pivot joint contains a biasing element that biases said shovel head toward said predetermined orientation when said pivot joint is not configured in said first condition.

6. The device according to claim 1, wherein said pivot joint contains a flange coupled to said shovel head and pin elements coupled to said shaft, wherein all of said pin elements engage said flange when said pivot joint is configured in said first condition.

7. The device according to claim 6, wherein only some of said pin elements engage said flange when said pivot joint is not configured in said first condition.

8. The device according to claim 1, further including at least one side handle extending from said shaft between said first end and said second end.

9. A shovel, comprising:

a shovel head having a forward edge, wherein said forward edge has a midpoint;

a shaft;

a coupling interposed between said shovel head and said shaft, wherein said coupling is selectively configurable between a first configuration where said shovel head is rigidly affixed to said shaft, a second configuration where said shovel head is free to rotate relative to said shaft in a first direction, and a third configuration where said shovel head is free to rotate relative to said shaft in an opposite second direction.

10. The shovel according to claim 9, further including a manual control for selectively configuring said coupling between said first configuration, said second configuration and said third configuration.

11. The shovel according to claim 10, further including a handle coupled to said shaft, wherein said manual control is contained within said handle.

12. The shovel according to claim 9, wherein said shovel head is in a predetermined orientation with respect to said shaft when said coupling is configured in said first configuration.

13. The shovel according to claim 9, wherein said coupling contains a biasing element that biases said forward edge of said shovel head toward a horizontal orientation when said pivot joint is not configured in said first configuration.

14. The shovel according to claim 9, wherein said forward edge of said shovel head rotates about said midpoint when said coupling is in said second configuration.

* * * * *